(12) United States Patent
Eckardt et al.

(10) Patent No.: US 8,126,107 B2
(45) Date of Patent: Feb. 28, 2012

(54) NUCLEAR ENGINEERING PLANT AND CLOSURE APPARATUS FOR ITS CONTAINMENT

(75) Inventors: Bernd Eckardt, Offenbach (DE); Norbert Losch, Offenbach (DE)

(73) Assignee: Areva NP GmbH, Elangen (DE)

( * ) Notice: Subject to any disclaimer, the term of this patent is extended or adjusted under 35 U.S.C. 154(b) by 0 days.

(21) Appl. No.: 12/205,513

(22) Filed: Sep. 5, 2008

(65) Prior Publication Data

US 2009/0067565 A1 Mar. 12, 2009

Related U.S. Application Data

(63) Continuation of application No. PCT/EP2007/000572, filed on Jan. 24, 2007.

(30) Foreign Application Priority Data

Mar. 7, 2006 (DE) .......................... 10 2006 010 826

(51) Int. Cl.
*G21C 9/00* (2006.01)
*F16K 17/14* (2006.01)
*F16K 17/40* (2006.01)

(52) U.S. Cl. ..................................... 376/293; 137/68.11

(58) Field of Classification Search .................. 376/293; 137/68.11–68.3
See application file for complete search history.

(56) References Cited

U.S. PATENT DOCUMENTS 3,423,286 A * 1/1969 Weems et al. ................. 376/284
(Continued)

FOREIGN PATENT DOCUMENTS

DE 1078836 3/1960
(Continued)

OTHER PUBLICATIONS

International Search Report dated Jun. 4, 2007.
(Continued)

*Primary Examiner* — Rick Palabrica
*Assistant Examiner* — Erin M Leach
(74) *Attorney, Agent, or Firm* — Laurence A. Greenberg; Werner H. Stemer; Ralph E. Locher

(57) ABSTRACT

A nuclear engineering plant has a containment, whose interior chamber is subdivided by a wall into a systems chamber and an operating chamber which is accessible during normal operation. The containment ensures a particularly high operational reliability, in particular also in incident situations, in which hydrogen is released in the systems chamber. For this purpose, a number of overflow openings are provided in the partition wall, the respective overflow opening is closed by a closure element of a closure apparatus which opens automatically when a trigger condition associated with the respective overflow opening is reached. Closure apparatuses are provided which open both as a function of pressure and independently of pressure. The closure apparatus furthermore has a closure element containing a bursting film or a bursting diaphragm. The closure apparatus is configured such that it frees the overflow opening automatically when a predetermined environment-side trigger temperature is reached.

20 Claims, 5 Drawing Sheets

U.S. PATENT DOCUMENTS

| | | | | |
|---|---|---|---|---|
| 3,906,976 | A | * | 9/1975 | Nohr et al. ............... 137/68.26 |
| 4,006,780 | A | | 2/1977 | Zehr |
| 4,057,464 | A | * | 11/1977 | Mair et al. ............... 376/314 |
| 4,706,698 | A | | 11/1987 | Short, III |
| 4,777,013 | A | * | 10/1988 | Wolters et al. ............... 376/283 |
| 5,703,917 | A | * | 12/1997 | Hau et al. ............... 376/280 |
| 5,738,276 | A | | 4/1998 | Saur |
| 5,740,217 | A | * | 4/1998 | Spinks ............... 376/301 |
| 5,889,830 | A | * | 3/1999 | Hollmann ............... 376/280 |
| 2003/0035505 | A1 | | 2/2003 | Wider et al. |

FOREIGN PATENT DOCUMENTS

| | | | |
|---|---|---|---|
| DE | 1614631 | | 7/1970 |
| DE | 2057593 | A1 | 5/1972 |
| DE | 2356398 | | 9/1974 |
| DE | 8618773 | U1 | 11/1986 |
| DE | 29602532 | U1 | 4/1996 |
| DE | 19625405 | A1 | 1/1998 |
| DE | 10045637 | A1 | 3/2002 |
| EP | 0973172 | A1 | 1/2000 |
| FR | 2355139 | | 1/1978 |
| GB | 1237390 | A | 6/1971 |
| GB | 1344308 | A | 1/1974 |
| GB | 2181786 | A | 4/1987 |
| JP | 55070798 | A | 5/1980 |
| JP | 59031497 | A | 2/1984 |
| JP | 63282961 | A * | 11/1988 |
| JP | 2098690 | A | 4/1990 |
| JP | 3076439 | B | 12/1991 |
| KR | 100488244 | | 5/2005 |
| KR | 1019990067183 | | 8/2005 |
| SU | 404877 | A | 7/1974 |
| SU | 9587757 | A | 9/1982 |
| WO | 9716832 | A1 | 5/1997 |

OTHER PUBLICATIONS

English translation of Korean Office Action dated Nov. 17, 2010.

* cited by examiner

NUCLEAR ENGINEERING PLANT AND CLOSURE APPARATUS FOR ITS CONTAINMENT

CROSS-REFERENCE TO RELATED APPLICATION

This is a continuation, under 35 U.S.C. §120, of copending international application PCT/EP2007/000572, filed Jan. 24, 2007, which designated the United States; this application also claims the priority, under 35 U.S.C. §119, of German patent application DE 10 2006 010 826.4, filed Mar. 7, 2006; the prior applications are herewith incorporated by reference in their entirety.

BACKGROUND OF THE INVENTION

Field of the Invention

The invention relates to a nuclear engineering plant, in particular to a pressurized-water reactor, with a containment. The interior of which is divided by a gas-tight intermediate wall into a plant space containing a reactor pressure vessel and a primary cooling circuit and into an operating space which is walkable during normal operation. In addition, a plurality of overflow openings are formed in the intermediate wall. The invention further relates to a closure apparatus for an overflow opening disposed in the intermediate wall.

Within the context of the safety-related configuration of a nuclear power plant, the reactor pressure vessel enclosing the reactor core is usually arranged in a containment. The containment contains a large number of redundant and diversified safety apparatuses which ensure reliable cooling of the reactor core in cases of disruptions to the normal operation of the nuclear power plant, in particular if the reactor core experiences a loss in coolant. The containment additionally ensures, as a gas-tight mantle which is often kept at a negative pressure with respect to the surrounding area, that even in case of an incident no radioactivity can leak into the surrounding area. The term containment also encompasses the atmosphere it encloses.

Most of the plants built to date have so-called single-space containments without clear separation of the internal volumes which are not walkable during normal operation. This makes control and maintenance work in the containment difficult. If the interior of the containment is to be accessed, the reactor usually needs to be shutdown beforehand in a timely manner and the containment atmosphere be decontaminated, which can entail relatively long downtimes.

In order to circumvent such difficulties, so-called two-space containments have already been proposed, in which the interior of the containment is divided by a gas-tight intermediate wall, generally a concrete intermediate wall, into a plant space containing the reactor pressure vessel and the primary cooling circuit and into an operating space which is screened off therefrom in terms of radiation and ventilation and can also be accessed during operation. In this concept, during normal operation the plant space with the active and high energy primary circuit components which are contaminated to a greater degree is therefore completely separated and screened off from the remaining containment areas which are walkable and thus accessible for maintenance purposes, the so-called operating space.

In the case of incidents and especially accidents with increased core temperatures, which can be caused for example by a leak in the primary cooling circuit, a massive release of steam and explosive gases, primarily hydrogen, into the internal separated-off space areas of the containment can occur under certain circumstances. Especially in the case of a two-space containment of the type described above, a relatively rapid rise in pressure and a strong concentration of ignitable gases can occur within the comparatively small volume of the plant space. Even with smaller leak cross sections which lead only to a comparatively slow build-up in pressure in the plant space, critical concentrations of ignitable gases or explosive gas mixtures can arise in localized fashion due to the limited expansion volume.

In such cases of incidents or accidents, the aim is therefore for an effective distribution of the incident atmosphere in the entire containment volume which restricts the local and global maximum concentrations of ignitable gases. To this end, the intermediate wall contains, between the plant space and the operating space, overflow openings which have hitherto been closed primarily with bursting screens and which open when the bursting pressure is reached. Since certain fluctuations in the bursting tolerance are unavoidable in the configuration and manufacture of the bursting elements, the solution described has the disadvantage, however, that, especially in the more likely incident situations with smaller leaks and slower build-up in pressure, typically only that bursting element with the lowest individual bursting pressure opens. The pressure equalization thus induced generally prevents the opening of the other bursting elements. As a result of the only partial space opening, the convective distribution of the gases which are capable of detonating is severely restricted, with the result that the risk of explosion must be reduced by way of increased use of inertization apparatuses and recombiners or the like. Such measures are generally comparatively complex and expensive and cannot be regarded as optimum in view of the level of safety which can be achieved.

Other safety concepts which have to date been conceived and, in part, realized envisage, additionally or alternatively to the bursting screens, hand-operated flaps which can be operated or actuated by way of cable pulls or else electromotorically by the operators stationed outside the containment in order to release the overflow cross sections in case of emergency. However, hand-operated emergency devices have proven too slow and too unreliable in many incident scenarios, especially in the case of those which involve a very early hydrogen release, and are also severely limited in terms of number and opening cross section due to the high outlay necessary. In general, any erroneous operations which are based on human failure or on situational misjudgement should be precluded from happening in advance in a safety-critical plant such as a nuclear power plant. Alternative solutions with motor-driven closure flaps are problematic due to their dependence on an intact energy supply. Furthermore, these motor-driven closure flaps are not effective in the case of large fracture cross sections of high energy pipelines due to the delayed opening to relieve pressure and the significant space requirement (drive, transmission, etc.) results in that no relevant installation spaces for pressure-relief elements are available. Detailed $H_2$ distribution and pressure build-up analyses carried out in accident situations involving massive $H_2$ releases utilizing the above devices generally confirm this problem.

SUMMARY OF THE INVENTION

It is accordingly an object of the invention to provide a nuclear engineering plant and a closure apparatus for its containment which overcome the above-mentioned disadvantages of the prior art devices of this general type, which ensures particularly high operational safety, in particular also in incident situations with relevant hydrogen release in the core area or primary cooling circuit, while keeping complexity in terms of manufacture and operation low. The invention furthermore specifies a closure apparatus, which is particularly suitable for use in such a plant, for a pressure relief and overflow opening disposed in the intermediate wall between plant space and operating space.

With the foregoing and other objects in view there is provided, in accordance with the invention, a nuclear engineering plant. The plant contains a containment including an interior and a gas-tight intermediate wall dividing the interior into a plant space having a reactor pressure vessel and a primary cooling circuit and into an operating space being walkable during normal operation. The gas-tight intermediate wall has a plurality of overflow openings formed therein. The containment further has closure apparatuses with closure elements each closing a respective one of the overflow openings. The closure elements open automatically when a trigger condition associated with the respective overflow opening has been reached. The closure apparatuses opens in dependence on a pressure and opens independently of the pressure.

The object is achieved according to the invention with respect to the nuclear engineering plant by virtue of the fact that the respective relief and overflow opening is closed by a closure element of a closure apparatus which opens automatically when a trigger condition associated with the respective overflow opening has been reached, wherein closure apparatuses which open as a function of pressure and which open independently of pressure are provided.

The invention proceeds from the consideration that in a nuclear engineering plant of the type mentioned in the introduction, even in the case of an incident with possibly massive release of steam and flammable or explosive gases, the local and global maximum concentrations of these gases should be kept to a minimum already for type and design reasons. Mixtures which are capable of detonating and could endanger the integrity of the containment should not even be allowed to occur in the first place. In case of an incident occurring inside the plant space, rapid opening of the space should therefore follow for the purposes of the effective distribution of the incident atmosphere and limitation of the gas concentrations in the entire containment volume. The closure apparatuses, which are arranged in the overflow openings of the intermediate wall and which, in the closed state, ensure the space separation and the separation of plant space and operating space in terms of ventilation and radiation protection during normal operation, should additionally be constructed in accordance with the design principles diversity, passivity, redundancy and failure safety such that, if an incident occurs, an automatic and self-supporting opening or release of the overflow cross sections preferably without the need for outside energy follows.

For a particularly effective distribution of the gases which are released due to the incident and their mixing with the entire remaining containment atmosphere and for effective pressure relief in the plant spaces in the case of large pipeline fractures, not merely individual but a number of, ideally many or even all of the closure elements should release the flow passages they block during normal operation at the same time or at least nearly at the same time. This should also apply in particular in the case of comparatively small leaks in the primary circuit and the associated slow build-up of pressure. To this end, according to the present concept, provision is made first for in each case one incident-related trigger condition to be associated with the closure apparatuses which are independent of one another, with the trigger condition taking into consideration the specific ambient conditions, operational parameters and influence factors at the respective site of use, i.e. at the site of the respective overflow opening. Second, in addition to a purely pressure-dependent trigger mechanism which can be realized for example simply by way of a conventional bursting film or the like, or as an alternative thereto, at least for some of the closure apparatuses at least one further trigger principle which is not dependent on pressure is provided. Such a diversified design of the closure apparatuses or of the associated trigger apparatuses and the selection, which is matched to the respective overflow opening, of the trigger parameters, the threshold values, the sensitivities etc. result in an early and nearly simultaneous response to even comparatively harmless incident situations in not just a single one, but in a large number of decentrally triggered closure apparatuses which are independent of one another.

In order to achieve the intended diversity, the nuclear engineering plant can advantageously have at least two types of closure apparatuses, where the operating principles thereof which form the basis of the trigger procedure and/or the operation procedure differ. Alternatively or additionally thereto, however, at least one closure apparatus may also be provided, in which a plurality of trigger apparatuses which are based on differing operating principles are combined.

A nuclear engineering plant, where closure apparatuses which open as a function of the temperature are provided in addition to the closure apparatuses which open as a function of pressure, is particularly advantageous. This is because, in the case of a slow build-up of pressure in the plant space, generally only one or few of the pressure-sensitive closure apparatuses or bursting elements open when the individual trigger pressure or bursting pressure is reached, which in itself could entail an only inadequate space opening and mixing of the containment atmosphere. Since during an incident usually also the temperature in the plant space increases at the same time, for example due to hot steam escaping from a leak in the primary circuit, further overflow cross sections are released by the temperature-sensitive closure apparatuses which result in an effective distribution of the incident atmosphere.

Advantageously, at least one closure apparatus is configured such that it opens automatically as soon as the atmosphere pressure in the plant space exceeds a predetermined trigger pressure. Rather than a trigger condition relating to an absolute value of the pressure, it is also possible for a relative criterion to be used such that at least one closure apparatus opens automatically as soon as the pressure difference between the plant space and the operating space exceeds a predetermined trigger value. The trigger value is preferably approximately 20 mbar to 300 mbar.

Furthermore, at least one closure apparatus is configured such that it opens automatically as soon as the local atmosphere temperature at a measurement location in the plant space exceeds a predetermined trigger temperature. Advantageously, the associated temperature-dependent trigger or unlocking apparatus is integrated in the closure apparatus, i.e. the measurement location is situated directly where the closure apparatus is mounted or at or in the overflow opening. Alternatively or additionally to this, it is also possible, however, for at least one closure apparatus to be provided, in which a closure element is coupled, via a remote-controlled apparatus, to a temperature-dependent trigger apparatus which is positioned near the ceiling of the plant space. It is expedient here if a closure element arranged in the lower region of the plant space can be actuated or unlocked by way of a fusible solder device arranged at a higher level or the like, with the result that the higher temperatures occurring in the upper regions in case of a temperature stratification (temperature layering) are utilized for the unambiguous triggering and reliable opening of the lower overflow devices, too.

The trigger temperature is expediently matched to the room temperature in the plant space which is provided for normal operation and is advantageously kept below 60° C. by an air recirculation and cooling system. It is preferably selected from the interval from approximately 65° C. to 90° C. In a particularly expedient refinement, the trigger temperatures of the closure apparatuses which open as a function of temperature are selected in a staggered manner or such that they increase as the installation height of the apparatuses increases, e.g. from 65° C. to 90° C., which takes the temperature stratification in the plant space into account. Thus, a rapid and approximately simultaneous opening of all the closure apparatuses is favored in this case, too.

In an advantageous development, at least one closure apparatus is configured such that it opens automatically as soon as the concentration of a gas which is flammable or capable of exploding and is present in the atmosphere of the plant space, in particular the concentration of hydrogen, exceeds a predetermined trigger concentration. Therefore, another diversification of the trigger criteria in addition to a pressure-sensitive and temperature-sensitive triggering is achieved by the concentration of the ignitable gases being monitored, wherein exceeding a predetermined limit value leads to the automatic opening of the closure apparatuses which close during normal operation the overflow cross sections. Advantageously, the trigger concentration is approximately 1 to 4 percent by volume of $H_2$.

In a particularly advantageous refinement, such a concentration-sensitive triggering can be achieved by a catalytic element, which releases heat in the presence of explosive or ignitable gases, or a $H_2$ recombiner being arranged near a closure apparatus which opens as a function of temperature or near a temperature-sensitive trigger apparatus which is associated therewith such that the heat released thereby triggers the opening of the closure apparatus when a threshold value is exceeded. By way of example, the respective recombiner is arranged just underneath a fusible solder opening device which initiates the opening of the closure element, with the result that the increased operating temperature in the recombiner in case $H_2$ is present causes reliable opening of the overflow cross section in a diversified manner—i.e. even in case of otherwise low room temperatures and independently of any release of steam. Instead of a recombiner, or in addition thereto, a catalytic element on the basis of a metallic carrier with washcoat coating and the catalytically active materials platinum and/or palladium can, for example, also be provided. If hydrogen is present, the exothermic heat of reaction ensures even at a concentration of from 1 to 4 percent by volume reliable triggering of the temperature-sensitive closure apparatus, even independently of the other room temperature.

Furthermore, a first subset of the overflow openings, which are in each case provided with one of the closure apparatuses, is advantageously arranged in the lower third, in particular near the floor of the plant space, and a second subset is advantageously arranged in the higher regions, in particular in the sections of the intermediate wall which form the ceiling of the plant space. The difference in height between the high and low overflow openings is here preferably more than 5 m, in particular more than 20 m, in order to effectively drive in a passive manner the convection rollers by way of the difference in density of the atmosphere columns between the plant and the operating spaces. Here, there is expediently a number of recombiners mounted on the inside wall of the plant space between the lower and the higher overflow openings. Due to the reduced density resulting in the case of an incident from the failure of the space cooling or due to the release of steam, the chimney effect in the plant spaces which is possibly even increased by the heat of reaction of the catalytic recombiners is used to drive large-area convection rollers in the containment. In this manner, an increase of the overflow speeds to 0.5 m/s to 2 m/s or more is achieved. The manner in which the recombiners are expediently arranged here is selected such that an increased release of heat of reaction in the so-called chimney region of the plant spaces, i.e. in the upper regions of the steam generator towers and above the low overflow openings is achieved. In this manner, the recombiners are impacted by flow with increased entry speed after the space opening, which favors a particularly effective hydrogen reduction. Particularly preferably, the recombiners are arranged inside the plant space such that the $H_2$ reduction power in the plant spaces is more than 20% of the overall $H_2$ reduction power of for example more than 50 kg/h.

Large pressure-relief areas become possible through the combination of these relief and overflow elements which can now all largely open as a function of pressure. Preferably, the area covered overall by the closure elements is approximately 0.1 to 0.5 times the horizontal cross-sectional area of the plant space. This also leads to a serious limitation in the difference pressure loading in the plant spaces even in the case of serious pipeline fractures, with the result that a planar steel beam holding and sealing construction is made possible even in the case of only limited load reduction (due to the technically possible section moduli). In this manner, the pressure loads occurring in the case of serious pipeline fractures and large leaks are limited to less than 0.5 times, in particular to less than 0.2 times, the design pressure for the containment. In order to ensure a particularly effective convection even in the case of small leaks, the total area of the overflow openings per steam generator tower is moreover advantageously more than 1 $m^2$, in particular more than 5 $m^2$.

Advantageously, the nuclear engineering plant has a cooling apparatus, in particular in the form of an air recirculation and cooling system, for cooling the air in the plant space, wherein the cooling power of the cooling apparatus is preferably such that the room temperature in the plant space can be reduced during normal operation permanently to less than 60° C. The cooling minimizes in particular the chimney effect, which is established during normal operation, in the plant space with respect to the operating space and thus the pressure difference influencing the seals of the closure elements. Furthermore, the nuclear engineering plant contains a suction apparatus for the air which is in the plant space and a purifying apparatus, which is connected upstream or downstream on the flow side of the suction apparatus, for purifying and decontaminating the sucked-off air. During normal operation, a slight negative pressure of approximately 10 Pascal or more with respect to the operating space is thus produced in the plant space due to the air being sucked off from the plant space, wherein the pressure difference must not exceed the trigger value which leads to bursting of the bursting elements or else to pressure-dependent opening of the closure apparatuses. The sucked-off space air is purified as far as possible in aerosol and iodine filters before it is given off to the surrounding area.

A particularly expedient closure apparatus for one of the overflow openings of the nuclear engineering plant advantageously has a closure element containing a bursting film or a bursting screen, wherein the closure apparatus is configured such that it automatically releases the flow cross section when a predetermined trigger temperature on the side of the surrounding area is reached. In other words, the two functions "pressure-dependent opening" and "temperature-dependent opening" are combined in a single closure apparatus, wherein the closure apparatus which is configured as a passive element opens automatically, autonomously, without delay and preferably without the need for outside energy (as per the failsafe principle) when one of the two trigger conditions (trigger pressure or trigger temperature) is reached, and releases the overflow cross section. This minimizes the number of closure apparatuses necessary for a diversified design of the opening mechanisms and enables the accommodation of correspondingly large opening areas of closure elements within planar ceiling constructions. Such a construction furthermore limits the difference pressure acting on the respective apparatus during maximum pressure increase, so that a particularly cost-effective construction of the respective opening element and of the structures of the plant spaces loaded by the difference pressure becomes possible. Here, the pressure-dependent opening in proven fashion by way of a bursting film or bursting screen, which forms the actual closure element or is integrated in the closure element, is realized.

Advantageously, the respective closure apparatus contains an actuating apparatus which acts, in the case of a temperature-dependent triggering, directly on the bursting screen or on the bursting film and results in the destruction or tearing of the latter. This is preferably a spring-driven actuating apparatus. The closure apparatus furthermore preferably contains a locking apparatus which blocks the actuating apparatus before the trigger temperature is reached or compensates for it in terms of its effect. By way of example, a tension spring, which is pre-tensioned but blocked during normal operation by a fusible solder device, can be fixed directly and approximately centrally on the bursting film such that the tension spring is released when the melting temperature is reached, with the tension spring in that case tearing the bursting film following its release.

According to an advantageous alternative embodiment, the bursting screen or the bursting film can also be mounted, or clamped in, on a frame element which is mounted such that it can rotate or pivot on the wall. The frame element can be fixed in the closed position by a locking element and the locking element is configured, or coupled to a temperature-dependent trigger apparatus, such that it is unlocked when the trigger temperature is reached. By way of example, the bursting element can be held in a frame element which is pressed against a planar supporting and sealing construction via a fusible solder apparatus. When the melting temperature is reached, the entire frame element is released and opens due to gravity and/or the spring force. If temperature-dependent triggering has not yet taken place, alternatively the bursting film or the bursting screen in the closure element opens when the bursting pressure is reached.

The fusible solder apparatuses are expediently concentrated on a holding element or a few holding elements on the frame and are provided with tensioning elements. On account of the construction, the contact-pressure force is distributed over the sealing elements such that a sufficient tightness is achieved and a simple functional examination or a simple exchange is made possible.

In another advantageous variant, the triggering and opening of the closure element is effected using a trigger apparatus which is disposed remote from the closure element and acts in a trigger event via a mechanical or pneumatic/hydraulic remote-controlled apparatus on the closure element or the associated locking element. For example, a trigger apparatus containing a fusible solder or a fusible bead can be mounted in the higher regions of the plant space, wherein the triggering is transmitted via a cable pull or a tensioned spring element or the like to a lower closure element. In an alternative system, in a trigger event, a pipeline which is connected to a pressure accumulator or to one or more hydraulic reservoirs and is closed during normal operation by a fusible bead or a fusible solder is released, so that as a consequence of the starting application of pressure, a closure element which is arranged at a distance is unlocked or opened.

The closure element is preferably configured and mounted on the wall such that the process of opening is driven or assisted by the inherent weight of the closure element. Suitable for this purpose is in particular horizontal fitting in the ceiling, wherein for example a closure element, which is in the form of a type of closure flap, is mounted with one or more hinges in the ceiling wall or another supporting construction and flaps downward to open during the process of opening.

In particular if the closure element is fitted vertically, it is expedient to provide a spring element or a compression leg which assists in the process of opening.

Alternatively or in addition thereto, overflow cross sections can also be opened by way of motor-actuated overflow flaps. These flaps are in this case preferably kept permanently closed in a motor-driven way and open due to spring force and/or their inherent weight. Here, opening can be triggered via a suitable measurement and control apparatus when a predetermined absolute or difference pressure or a trigger temperature is reached. If there is no voltage at the drive motor or the associated process control technology or when the trigger criterion (e.g. pressure, temperature or gas concentration) is reached, the closure element then opens reliably and without the need for outside energy as per the failsafe principle. In order to limit the difference pressure loading, closure elements of this type can also be fitted with bursting films.

The use of these overflow flaps, which are motor-actuated or held closed using motor force and can be especially in the form of louver flaps or of rotary pendulum flaps with spring return actuator, is expedient particularly in the low, temporarily cold inflow region of the plant space or of the intermediate wall delimiting it from the operating space, especially in combination with the temperature-sensitive and pressure-sensitive, large-area closure apparatuses, described above, in the high overflow regions. In order to ensure sufficient screening in the inflow opening region of the plant space, screening walls are provided upstream of the respective inflow device. The screening devices can also be arranged such that they are aligned radially in the lower third of the intermediate wall. The free convection cross section should be at least twice that of the inflow cross section.

The respective bursting film or bursting screen of the closure element is advantageously configured such that it tears or breaks, when a predetermined trigger pressure is applied to it, in the direction of both sides depending on the direction of attack of the pressure force. Thus, an opening of the overflow cross sections is also triggered in the case of an external positive pressure in the operating space, caused for example by a fracture of a secondary-side live-steam line. Moreover, the bursting elements are expediently configured such that, when radiation forces impact, no relevant fractured pieces can occur which could possibly cause secondary damage. Therefore, the bursting films are expediently configured such that they break in the one direction by tearing of the provided bursting material webs and in the opposite direction primarily by kinking. For sealing purposes, easily tearable sealing films with a thickness of less than 0.05 mm can additionally be used. In the event of negative or positive pressures of 20 mbar to 300 mbar, the bursting films thus expediently open in both directions.

The advantages attained by the invention are in particular that first the active and high energy plant components in a nuclear engineering plant, in particular in a pressurized-water reactor, are hermetically screened during normal operation against the surrounding operating spaces which thus remain walkable for any occurring control and maintenance work, and second, in incident and accident situations, with the danger of the release of ignitable gases, rapid, reliable and large-area space opening using passive, failure-safe elements on the basis of diversified operating principles is effected. The convective distribution of the released gases, optimized by a manner of arranging the overflow cross sections such that they are staggered in height, particularly reliably and simply effects a limitation of the maximum local concentrations, so that mixtures which are capable of detonating and could endanger the integrity of the containment are reliably avoided. Thus, the invention serves to increase the safety reserves in a nuclear reactor with simultaneous significant reduction in complexity and costs.

Other features which are considered as characteristic for the invention are set forth in the appended claims.

Although the invention is illustrated and described herein as embodied in a nuclear engineering plant and a closure apparatus for its containment, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
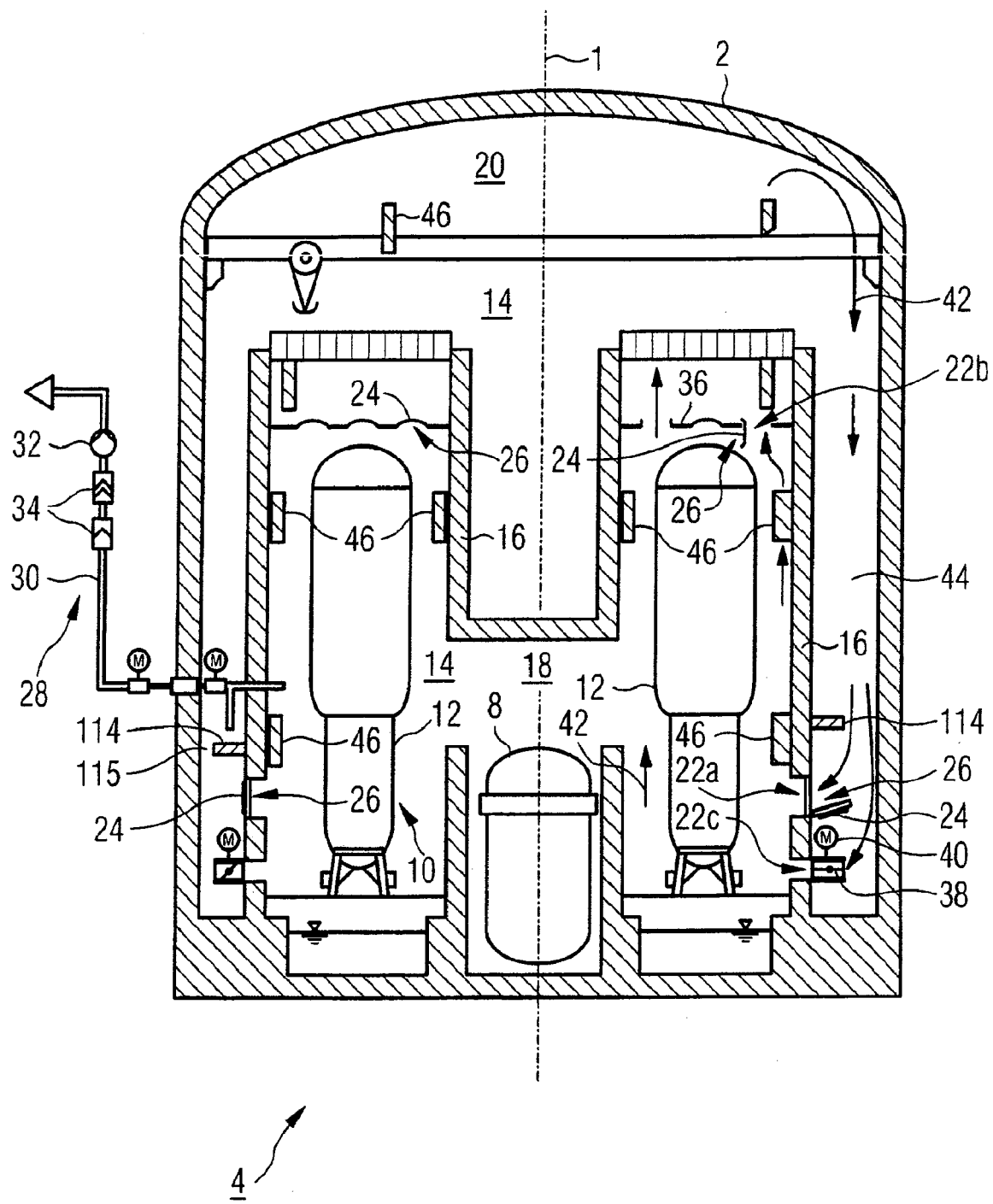
FIG. 1 is a diagrammatic, longitudinal sectional view of a containment for a nuclear engineering plant according to the invention.

Components having the same design or the same function are indicated by the same reference numbers in each of the figures. Referring now to the figures of the drawing in detail and first, particularly, to FIG. 1 thereof, there is shown in a longitudinal section a containment 2, which extends largely symmetrically with respect to a longitudinal axis 1, of a nuclear engineering plant 4 with a pressurized-water reactor. The containment 2 has inside nuclear components for generating hot and pressurized water steam, in particular a reactor pressure vessel 8 and a primary cooling circuit 10 connected to the former with a number of steam generators 12, and other system components. The shell forming the containment 2 also prevents activity transfers to the surrounding area in the case of a comparatively serious operational incident by closing in and keeping back coolant from escaping for example from a leak in the primary cooling circuit 10. Usually, the shell of the containment 2 is made of steel and is additionally surrounded by a non-illustrated concrete cladding.

The nuclear engineering plant 4 is configured for a particularly high operational reliability, wherein at the same time an extremely economical mode of operation is made possible. For this purpose, an interior 14 of the containment 2 is divided by a gas-tight intermediate wall 16 into a plant space 18 containing the reactor pressure vessel 8 and the primary cooling circuit 10, i.e. containing the active and high energy components, and into an operating space 20 which contains the other system components which are only comparatively weakly loaded with radioactivity. The plant space 18 and the operational space 20 are possibly in turn divided into further subspaces, but this is of no fundamental importance for the safety-related concept which will be explained below and for the associated design principles. The intermediate wall 16 is generally configured in a comparatively massive steel concrete construction, so that in addition to the ventilation-side separation of operational space 20 and plant space 18, a not insignificant screening effect against the radiation which is released inside the plant space 18 is also still realized. Thus, the operational space 20 remains walkable even during the operation of the nuclear engineering plant 4, and is thus easily accessible for any necessary control and maintenance work. The operation of the reactor generally only needs to be interrupted for maintenance work on the high energy nuclear components which are contaminated to a greater degree and are situated within the plant space 18.

Within the context of an operational incident, caused or accompanied for example by a leak in the primary cooling circuit 10, relevant amounts of ignitable and possibly explosive gases, in particular hydrogen, could also be released into the plant space 18 in addition to a release of hot steam. Since the volume of the plant space 18 is kept comparatively small, after a certain time critical concentrations would under certain circumstances be exceeded, at which an increased risk of explosion would have to be expected. In order to reliably preclude such critical states in advance, arranged in the intermediate wall 16 separating the plant space 18 from the operational space 20 is a number of overflow openings 22a, 22b, 22c which are closed in a gas-tight manner during normal operation by way of respectively assigned closure elements 24, but which release in the event of an incident or of a disaster state in the plant space 18 the respective overflow cross section early and, for reasons of an effective distribution of the incident atmosphere, in the entire containment 2. The respective closure element 24 is a constituent part of a passive closure apparatus 26 which effects, when a trigger condition which is considered to be an incident indicator is reached or exceeded, the opening of the overflow cross section automatically and without the need for outside energy.

During normal operation, a slight negative pressure with respect to the operational space 20 is generated in the plant space 18 by sucking off the atmosphere therein; the pressure difference here is approximately 10 Pa to at most 1,000 Pa. For reasons of sucking off the air, a suction apparatus denoted 28 in FIG. 1 is provided, which contains a suction line 30, which is guided through the intermediate wall 16 and through the containment 2 from the plant space 18 to the outside, and a suction pump 32 connected thereto. Before it escapes into the surrounding area, the air sucked off from the plant space 18 is purified and decontaminated with the aid of a multistage purifying apparatus 34 which is connected into the suction line 30 and contains a number of aerosol and iodine filters. Furthermore, the heat arising in the plant space 18 is continuously removed by an air recirculation and cooling system (not illustrated further here) such that the room temperature in the plant space 18 is, during normal operation, below a maximum value of approximately 60° C.

In the event of an incident which is due to a leak in the primary cooling circuit 10, the release of hot steam and gases produces an increase in pressure and also an increase in temperature inside the plant space 18, wherein furthermore the hydrogen content in the air or the concentration of other ignitable gases can rise. The pressure in the plant space 18 or the difference pressure with respect to the operational space 20 and the atmospheric temperature are therefore particularly relevant and suitable parameters for monitoring the nuclear engineering plant 4 for the occurrence of incidents. The closure apparatuses 26 are configured and constructed such that they automatically respond and effect the opening of the overflow cross sections as soon as one or more of the operational parameters (pressure, temperature, $H_2$ concentration) exceeds a threshold value which is to be considered to be an incident indicator. Due to the diversified configuration of the closure apparatuses 26 with respect to their trigger and actuation mechanisms, an extremely reliable and comparatively large-area space opening is achieved here even in the case of the more likely incident situations with comparatively slow build-up of pressure.

Moreover, the specific manner in which the overflow openings 22a, 22b, 22c are arranged in the intermediate wall 16 separating the plant space 18 from the operating space 20 ensures in the trigger event optimized flow conditions which promote rapid and uniform distribution of the released ignitable gases in the entire containment volume. For one, a number of comparatively low overflow openings 22a with pressure-sensitive and temperature-sensitive closure apparatuses 26 which open automatically in the trigger event are provided in vertical installation in the lower third of the plant space 18. Secondly, a plurality of such closure apparatuses are arranged in the overflow openings 22b of a ceiling 36 above the steam generator 12 (horizontal installation) and in the process form, as it were, an overflow ceiling. In order to adequately take into account the possible temperature stratification in the plant space 18, the trigger temperatures of the high closure apparatuses 26 with approximately 90° C. are selected to be higher than those of the low closure apparatuses 26 at approximately 65° C. Furthermore, in the area near the floor, motor-actuated overflow flaps 38 are installed in the overflow openings 22c located there, which are normally kept closed by an electromotor 40 and which in the trigger event, i.e. if the electromotor 40 is switched off or without voltage, open by way of spring force or gravity as per the failsafe principle.

As already explained, the diversification of the trigger mechanisms ensures that in the event of an incident in the core region of the reactor or in the primary cooling circuit 10, the predominant or at least a relevant number of closure apparatuses 26 or closure elements 24 open. This results in the flow course illustrated by flow arrows 42 in the right-hand part in FIG. 1, where the hot gases and steam escape the high overflow openings 22b in the ceiling 36 of the plant space 18 upward, cool off on the above ceiling of the containment 2 and subsequently drop downward in the ring-shaped intermediate space 44 between the intermediate wall 16 and the inside wall of the containment 2, in order to finally flow in again through the opened overflow cross sections 22a, 22c into the plant space 18. Circulating the flow causes an extremely effective mixing of the previously separated "internal" and "external" containment atmosphere, which reliably limits the maximum concentrations of gases or gas mixtures which are capable of detonating and could endanger the integrity or stability of the containment 2.

The flow cross section in the intermediate space 44 between the intermediate wall 16 and the inside wall of the containment 2 is narrowed by screening elements 114, which results in a particularly advantageous flow guidance. In the exemplary embodiment, the screening elements 114 form altogether a type of ring stop which is installed in the intermediate wall 16, approximately at a third of the height of the plant space 18. The remaining free convection cross section or inflow cross section 115 is about three times as large as that of the overflow openings 22a, 22c which are located underneath the screening elements 114 just as the inflow cross section.

Moreover, a plurality of catalytic recombiners 46 are used to reduce the released hydrogen and are disposed preferably on the inside wall of the plant space 18, in particular around the steam generators 12, such that they are impacted by the flow of the rising atmosphere at comparatively high entry speed when the overflow ceiling 36 is opened. The reduction in hydrogen is particularly effective in that case. Due to the heat of reaction, the overflow speeds in the high, ceiling-side overflow cross sections are increased to up to 2 m/s or more. Finally, at least some of the recombiners 46 are disposed near the temperature-sensitive closure apparatuses 26 such that the heat of reaction thereby produced with the occurrence of $H_2$ results in the trigger temperature being exceeded, i.e. in the opening of the respective overflow opening, even if the room temperature is otherwise rather relatively low. Due to this multiple use of the recombiners 46 used in the nuclear engineering plant 4 it is possible therefore to implement in a simple and cost-effective manner an additional trigger mechanism for the closure apparatuses 26 which is dependent on the hydrogen concentration.

Figure 2:
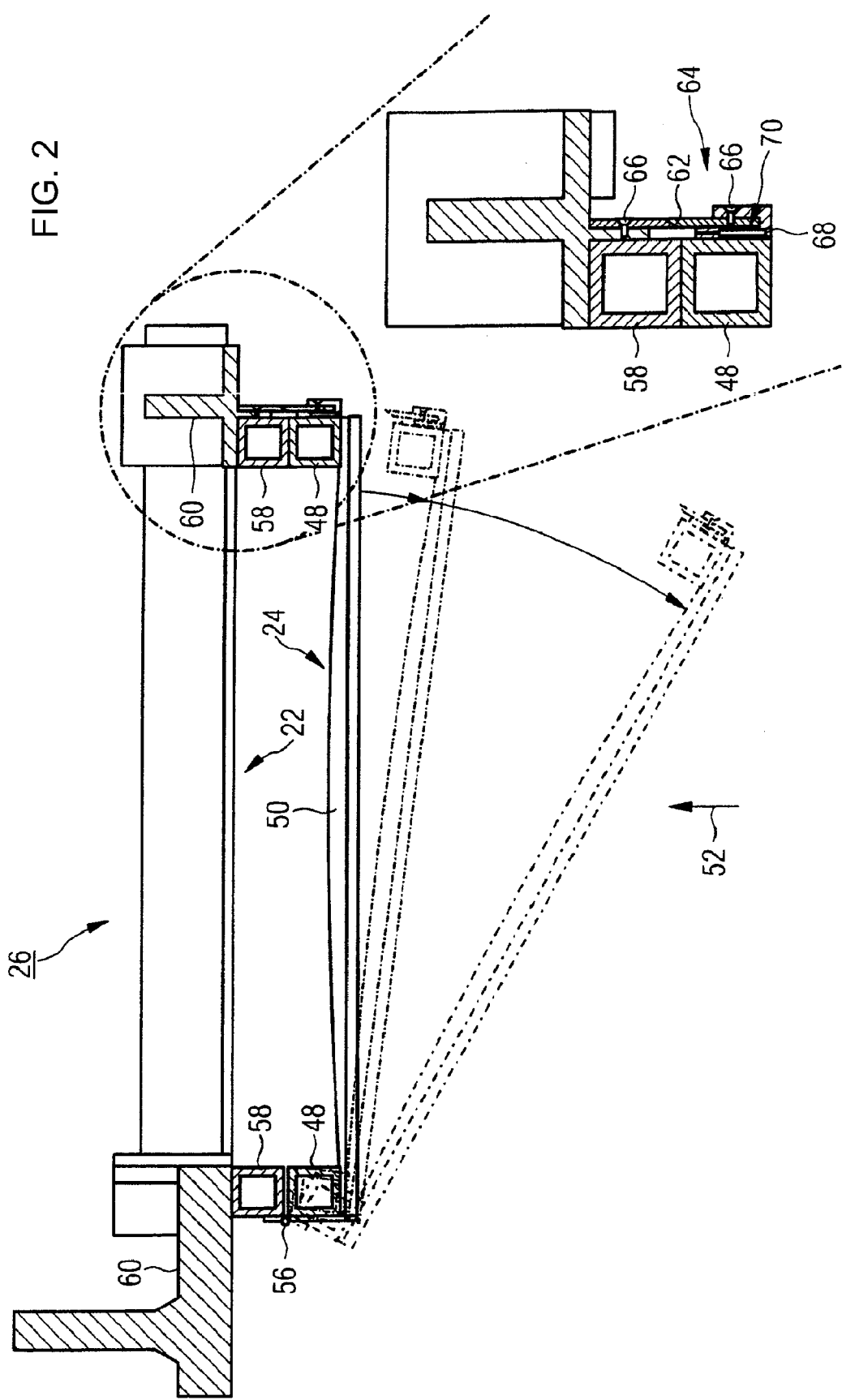
FIG. 2 is a diagrammatic, sectional view of a closure apparatus, which opens automatically in an event of a plant incident, for an overflow opening of the nuclear engineering plant shown in FIG. 1.

FIG. 2 shows by way of example the closure apparatus 26 which combines the two functions of pressure-dependent opening and temperature-dependent opening. In the embodiment shown here, the closure apparatus 26 is particularly suitable for horizontal installation in the ceiling 36 or the ceiling wall of the plant space 18 of the nuclear engineering plant 4; however, modifications with inclined or vertical installation positions, e.g. in a side wall, are also conceivable.

The closure apparatus 26 contains the closure element 24 which is provided for covering an overflow opening 22 and has a bursting film 50 which is clamped in a first frame element 48. The first frame element 48 has, in plan view from the direction denoted by directional arrow 52, a rectangular basic area. The frame element 48 itself is made of hollow beams which have a square cross section or with the use of other, e.g. open, steel profiles (L, U profile combinations). The first frame element 48 supporting the bursting film 50 is fixed using hinges 56 such that it can pivot to a second frame element 58 such that the complete closure element 24 can be opened in the case of need in the manner of a wing or a door or a pull-open window with respect to the second frame element 58 which is fixedly connected to a sealing and holding construction 60 and serves at the same time as a bearing and stop for the first frame element 48. The sealing and holding construction 60 for its part is fixedly anchored in a non-illustrated concrete ceiling or intermediate wall of the nuclear engineering plant. The two frame elements 48, 58 are arranged underneath the holding construction 60 so that the closure element 24 can freely flap downward to open in a trigger event.

During normal operation of the nuclear engineering plant 4, the closure element 24 is kept closed in a gas-tight manner, that is to say it is in the uppermost of the three positions which are illustrated in FIG. 2 and indicate the movement profile during opening.

The two frame elements 48, 58 then congruently overlap each other, wherein a high gas-tightness is achieved by way of providing sufficient contact pressure and, if appropriate, by way of a sealing device (not illustrated further here). This closed state is maintained during normal operation with the aid of a locking apparatus 64 containing fusible solder 62, which locking apparatus 64 is arranged on the two frame elements 48, 58 opposite that side of the frame elements which has the hinges. The rod-shaped or belt-shaped fusible solder 62 is, as can be easily seen in the detail illustration at the bottom right in FIG. 2, fixedly connected at its two ends in each case with the aid of a fastening screw 66 to the first frame element 48 which is mounted such that it can move on the one hand, and to the immovable second frame element 58 or the positionally fixed sealing and holding construction 60 on the other hand and in this manner prevents in the normal case the closure element 24 from opening. In addition, the contact pressure prevailing between the two frame elements 48, 58 can be adjusted by a tensioning apparatus 70 which can be adjusted using an adjustment screw 68, and therefore the tightness of the arrangement can be adjusted. The fusible solder device can expediently contain an arrangement of a plurality of parallel fusible solders which (in the manner of a comb) are mounted with a spacing of a few millimeters and thus enable the application of larger closure forces during normal operation of the plant. Such a design is furthermore particularly suitable to accommodate catalytic elements in the gap region between the individual fusible solder strips.

The melting point of the fusible solder 62 is selected such that the closure element 24 is released as soon as the room temperature at the site of the fusible solder 62 exceeds a specifically predetermined trigger value which is matched to the overflow opening. Therefore the fusible solder 62 is separated in its middle region between the two fixedly clamped or screwed-in ends by the starting melting process, whereupon the closure element 24 flaps downward to open as a result of its inherent weight and due to its "suspended" installation and releases the overflow opening 22 for through-flow purposes. After it has been triggered, the original state can easily be restored again by inserting a new fusible solder 62. Additionally, the exchange of the fusible solder device 62 can be used to easily carry out a repeating functional examination of the elements, and the trigger temperature can be changed and, for example, be matched to altered operational conditions of the nuclear engineering plant 4 or to altered safety regulations etc.

Alternatively to the temperature-dependent unlocking and opening of the closure element 24, the overflow cross section can also be opened by bursting of the bursting film 50 when the bursting pressure is reached.

Figure 3:
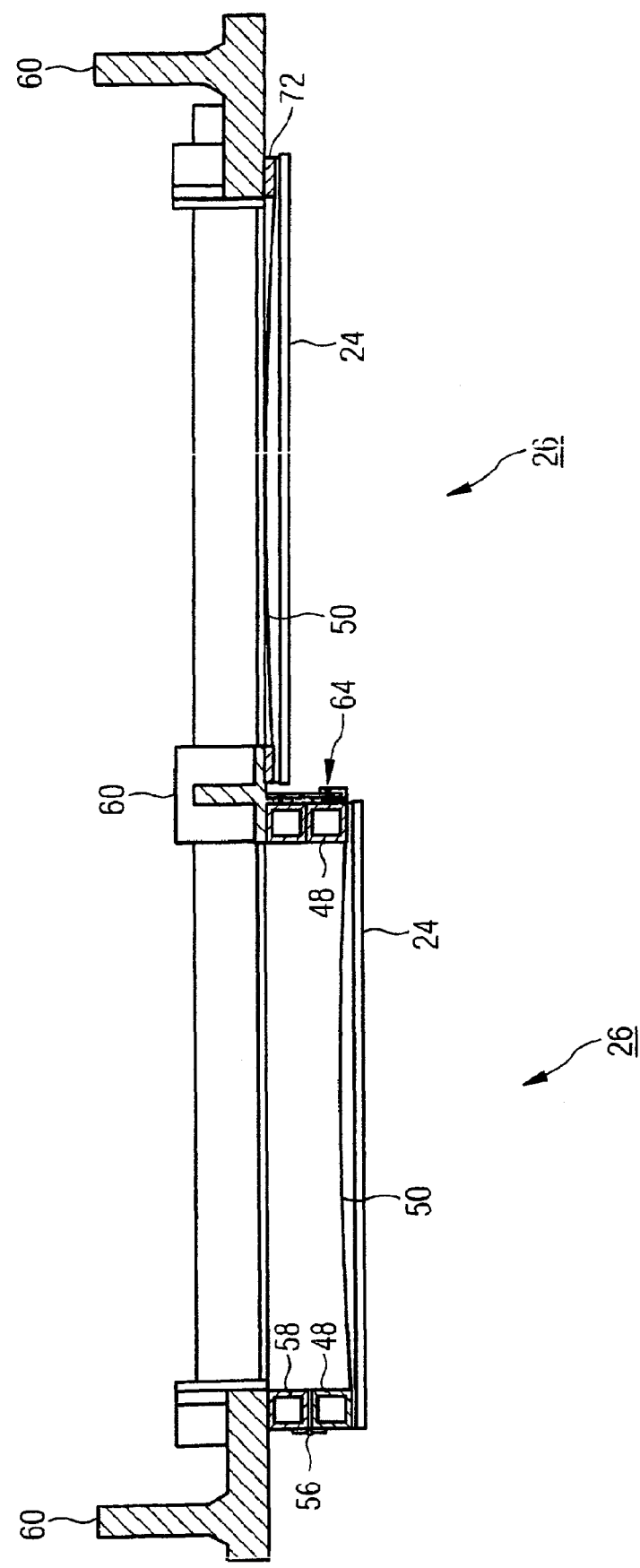
FIG. 3 is a diagrammatic, sectional view of two closure apparatuses of different types in a combined arrangement.

FIG. 3 shows a combination of two closure apparatuses 26 which are arranged directly next to one another in the overflow ceiling 36, of which the left one corresponds to the closure apparatus 26 known from FIG. 2 in terms of its configuration and its function, but the right one is configured somewhat simpler than a purely pressure-sensitive closure apparatus 26 with a bursting film 50 clamped in at a fixed frame 72. In general it is sufficient for many areas of use and applications to provide diversified trigger and opening mechanisms for only some of the closure apparatuses 26, as a result of which the overall complexity for conception, manufacture and maintenance of the nuclear engineering plant 4 can be kept comparatively low.

Figure 4:
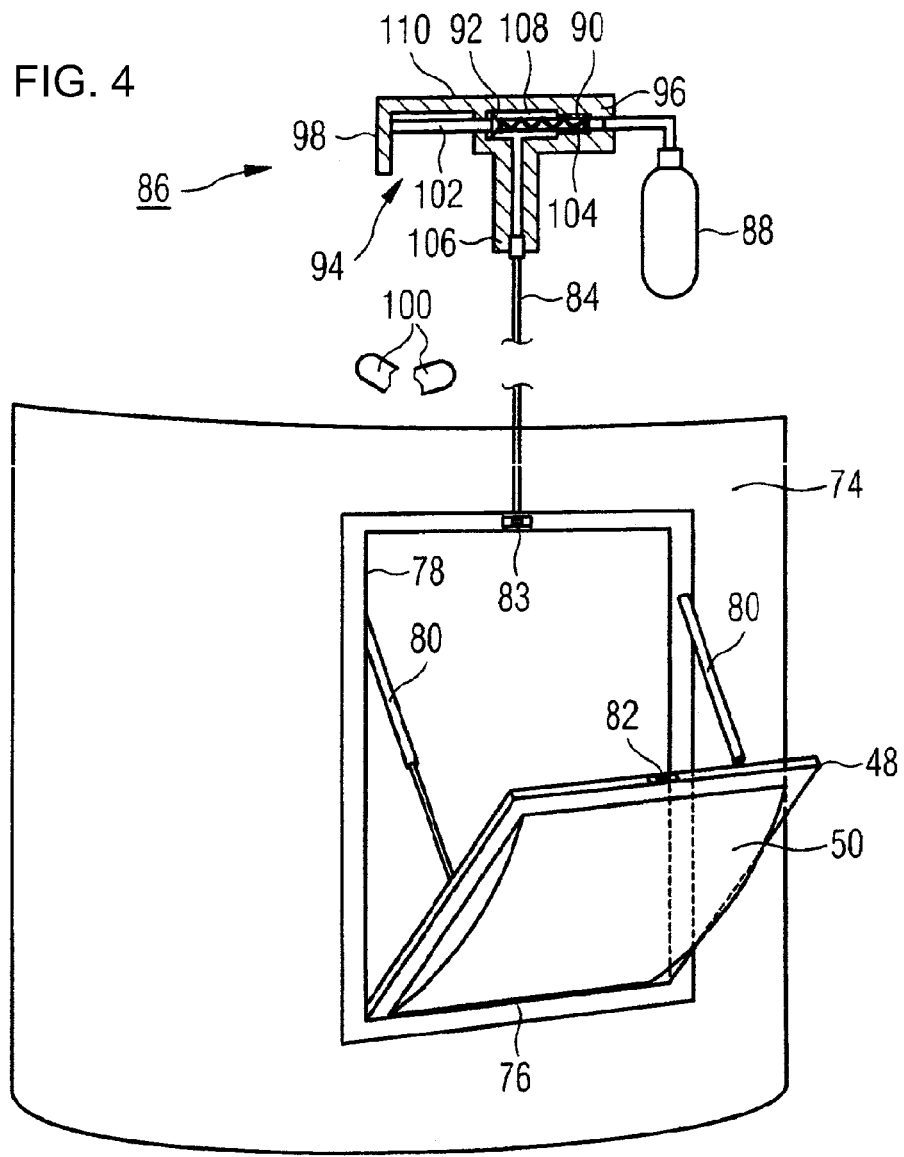
FIG. 4 is an illustration of a pressure-sensitive and a temperature-sensitive closure apparatus installed in a wall of the nuclear engineering plant as shown in FIG. 1, illustrated in an open state after a temperature-related triggering caused using a remote-controlled apparatus.

FIG. 4 illustrates an alternative embodiment of the closure apparatus 26 which is particularly suitable for use in the region of lower incident and accident temperatures, e.g. for vertical installation in a side wall 74 or in a section of the intermediate wall 16. Similarly to the closure apparatus 26 known from FIG. 3, this variant contains the bursting film 50 fixed to the frame element 48. The frame element 48 is mounted by a number of hinges 56 (which are not shown here) at its bottom longitudinal side 76 such that it can rotate on a frame-type supporting construction 78 which is inserted into the steel concrete wall such that it can flap downward to open into the opening position shown here largely due to its inherent weight when the locking is released. The process of opening is assisted, in particular in its initial phase, by the two telescope spring elements 80 which are arranged laterally and are fastened in each case at the ends of the movable frame element 48 and on the wall 74 in an articulated manner.

In the normal case, the frame element 48 is kept closed by a locking element 83 which is mounted on that side of the supporting and holding construction 78 which lies opposite the hinges 56 and in the process engages in a corresponding fitting part 82 of the frame element 48. In the present case, this is a pneumatic locking element 83 which unlocks when pressurized air is applied to it. The locking element 83 is additionally coupled via a pipeline 84, which is during normal operation of the nuclear engineering plant 4 without pressure, to a temperature-dependent trigger apparatus 86 which, in the trigger event, makes available the operating pressure which is necessary to unlock the locking element 83. The trigger apparatus 86 can be arranged relative to the locking element 83 expediently in a region of relatively high incident temperatures and can be conceived, depending on the length of the pipeline 84, also as a remote-controlled apparatus.

Figure 5:
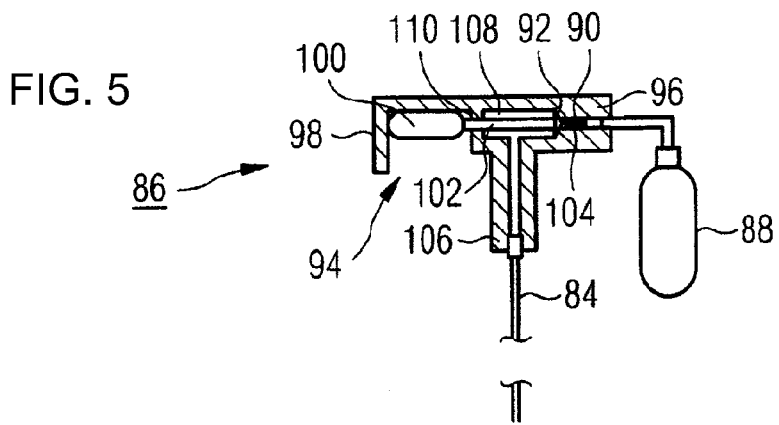
FIG. 5 is a diagrammatic, sectional view of a remote-controlled apparatus of the closure apparatus as shown in FIG. 4 before a start of a trigger event.

The trigger apparatus 86, which is illustrated in FIG. 5 before and in FIG. 4 after the trigger process, contains a pressurized-gas-filled pressurized-gas vessel 88 which can be closed on the outlet side by a stop valve 90. In the normal case, i.e. before the trigger condition is reached, a spring-loaded valve tappet 92 of the stop valve 90 is held in the closed state by a glass fuse 94. The fuse 94 can be in the form of a glass jacket, for example, and additionally contains a glass jacket 100 which is arranged outside the valve housing 96 and is fixed in position by a stop 98, to which glass jacket 100 an actuation rod 102 which presses against the valve tappet 92 and in the process fixes it in the closure position is attached. The glass jacket 100 is made of a glass material which, when it reaches a predetermined trigger temperature, typically 65° C. to 90° C., melts or breaks such that the previously blocked valve tappet 92 is made accessible. As a consequence of the positive pressure in the pressurized-gas vessel 88, and also assisted by the spring force of the compression spring 104, the valve tappet 92 opens so that the gas located in the pressurized-gas vessel 88 can escape there from and can flow first into an intermediate space 108 surrounded by a housing 106 and then into the pipeline 84 which is connected to the pneumatic locking element 83, as a result of which the locking element 83 is unlocked and the closure element 24 arranged in the wall 74 opens.

In the present embodiment, the glass jacket 100 is located outside the intermediate space 108, wherein the actuation rod 102 is guided through a corresponding cutout 110 in the housing wall. The actuation rod 102 can be displaced in the cutout 110 in its longitudinal direction. The gap between the actuation rod 102 and the housing 106 is kept small and is sealed off with the aid of a sealing ring or the like (not illustrated further here), which is fixed on the edge of the cutout 110, such that no leak-related loss of pressure occurs here.

The previously mentioned function of remote triggering can also be achieved by hydraulic devices or cable pull systems.

Figure 6:
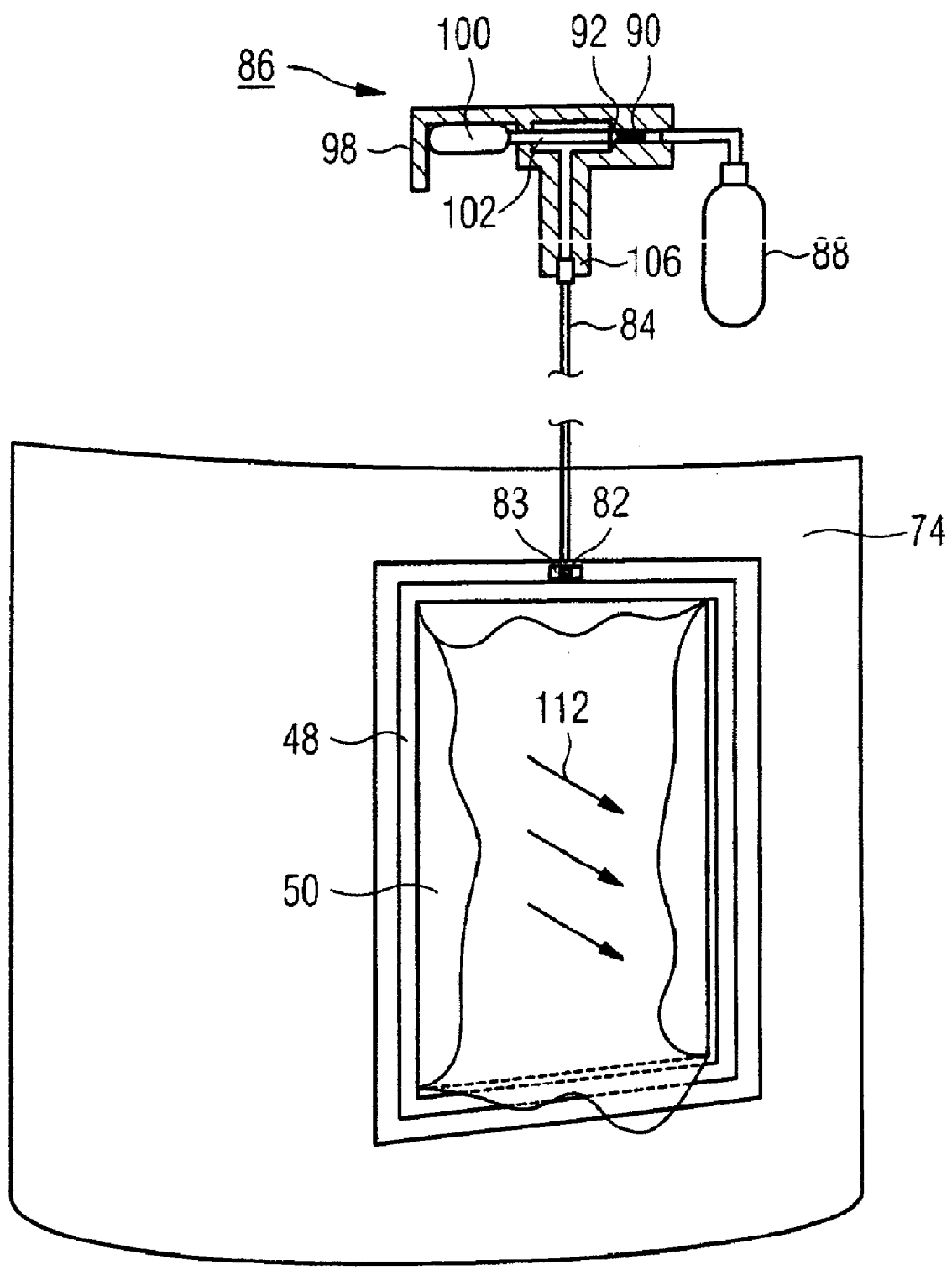
FIG. 6 is an illustration of the closure apparatus as shown in FIG. 4 after a pressure-related triggering.

FIG. 6 finally shows again the closure apparatus 26 known from FIG. 4, but here after a pressure-related trigger event which has led to tearing or bursting of the bursting film 50 with the frame element 48 kept closed. The arrows 112 indicate the starting flow.

The invention claimed is:

1. A nuclear engineering plant, comprising:
    a containment including an interior and a gas-tight intermediate wall dividing said interior into a plant space having a reactor pressure vessel and a primary cooling circuit and into an operating space being walkable during normal operation;
    said gas-tight intermediate wall having a plurality of overflow openings formed therein, said containment further having closure apparatuses with closure elements each closing a respective one of said overflow openings, said closure elements opening automatically when a trigger condition associated with said respective overflow opening has been reached;
    a first group of said closure apparatuses opening automatically in dependence on a pressure level indication; and
    a second group of said closure apparatuses opening automatically independent of the pressure level indication;
    at least two closure apparatuses of said second group of closure apparatuses opening in dependence on a temperature level indication;
    each of said at least two temperature level indication-dependent closure apparatuses opening as soon as an atmosphere temperature at a measurement location in said plant space exceeds a predetermined trigger temperature selected for that respective temperature level indication-dependent closure apparatus;
    said at least two temperature level indication-dependent closure apparatuses being located at different elevations in the containment; and
    said at least two temperature-dependent closure apparatuses being configured such that one of said at least two temperature level indication-dependent closure apparatuses located at a lower elevation opens at a lower predetermined trigger temperature than another one of said at least two temperature level indication-dependent closure apparatuses located at a higher elevation.

2. The nuclear engineering plant according to claim 1, wherein said containment has a plurality of trigger apparatuses based on differing operating principles and are combined in said closure apparatuses.

3. The nuclear engineering plant according to claim 1, wherein at least one of said closure apparatuses opens automatically as soon as an atmosphere pressure in said plant space exceeds a predetermined trigger pressure.

4. The nuclear engineering plant according to claim 1, wherein at least one of said closure apparatuses opens automatically as soon as a pressure difference between said plant space and said operating space exceeds a predetermined trigger value.

5. The nuclear engineering plant according to claim 4, wherein the predetermined trigger value is in a range of approximately 20 mbar to 300 mbar.

6. The nuclear engineering plant according to claim 1, wherein:
    said containment has a temperature level indication-dependent trigger apparatus and a remote-controlled apparatus;
    said plant space has a ceiling; and
    one of said closure elements is coupled, via said remote-controlled apparatus, to said temperature level indication-dependent trigger apparatus which is positioned in the higher regions of said plant space.

7. The nuclear engineering plant according to claim 1, wherein the predetermined trigger temperature of said one closure apparatus is in a range of approximately 65° C. to approximately 90° C.

8. The nuclear engineering plant according to claim 1, wherein at least one of said second group of closure apparatuses opens automatically as soon as a concentration of a gas which is one of flammable and capable of exploding and is present in an atmosphere of said plant space, exceeds a predetermined trigger concentration.

9. The nuclear engineering plant according to claim 8, wherein the predetermined trigger concentration is approximately 1 to 2 percent by volume.

10. The nuclear engineering plant according to claim 1, wherein at least one of said closure apparatuses open in dependence on a temperature level indication;
    the nuclear engineering plant additionally including at least one element that releases heat in a presence of explosive or ignitable gases;
    said at least one element being disposed such that heat released thereby triggers an opening of said at least one of said closure apparatuses when a threshold value is exceeded.

11. The nuclear engineering plant according to claim 1, wherein
    said plant space has a floor; and
    a first subset of said overflow openings, which are in each case provided with one of said closure apparatuses, is disposed near said floor of said plant space, and a second subset of said overflow openings is disposed in higher regions, and a difference in height is more than 5 meters between said first and second subsets.

12. The nuclear engineering plant according to claim 11, wherein said containment has a number of recombiners mounted on an inside wall of said plant space between said first subset and said second subset of said overflow openings.

13. The nuclear engineering plant according to claim 1, wherein an area covered overall by said closure elements is approximately 0.1 to 0.5 times a horizontal cross-sectional area of said plant space.

14. The nuclear engineering plant according to claim 1, wherein said containment has an additional screen disposed in a flow opening region of said plant space, and an inflow cross section of said flow opening region being delimited by said additional screen is at least twice an inflow cross section of associated ones of said overflow openings.

15. The nuclear engineering plant according to claim 1, wherein said containment has a planar holding and sealing construction formed from steel, said closure elements are fitted over a large area in said planar holding and sealing construction.

16. The nuclear engineering plant according to claim 1, wherein said containment has a cooling apparatus for cooling air in said plant space and has a cooling power such that a room temperature in said plant space can be reduced during normal operation permanently to less than 60° C.

17. The nuclear engineering plant according to claim 1, wherein said containment has a suction apparatus for air which is in said plant space and a purifying apparatus for purifying and decontaminating sucked-off air.

18. The nuclear engineering plant according to claim 11, wherein:

said second subset of said overflow openings is disposed in sections of said gas-tight intermediate wall which forms a ceiling of said plant space; and said difference in height is more than 20 meters.

19. The nuclear engineering plant according to claim 8, wherein the concentration of the gas is a concentration of hydrogen.

20. The nuclear engineering plant according to claim 10, wherein the element is a catalytic element.

* * * * *